(12) United States Patent  
Yang et al.

(10) Patent No.: US 7,042,512 B2  
(45) Date of Patent: May 9, 2006

(54) APPARATUS AND METHOD FOR ADAPTIVE MOTION COMPENSATED DE-INTERLACING OF VIDEO DATA

(75) Inventors: Seung-joon Yang, Gyeonggi-do (KR); Sung-hee Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 516 days.

(21) Appl. No.: 10/074,259

(22) Filed: Feb. 14, 2002

(65) Prior Publication Data

US 2002/0196362 A1    Dec. 26, 2002

(30) Foreign Application Priority Data

Jun. 11, 2001    (KR) ............................... 2001-32494

(51) Int. Cl.  
*H04N 7/01* (2006.01)

(52) U.S. Cl. ...................... 348/452; 348/448
(58) Field of Classification Search ............... 348/452, 348/448, 700, 699  
See application file for complete search history.

(56) References Cited

U.S. PATENT DOCUMENTS

| | | | | |
|---|---|---|---|---|
| 5,208,667 | A | * | 5/1993 | Saunders .................... 348/452 |
| 5,682,205 | A | * | 10/1997 | Sezan et al. ................ 348/452 |
| 5,784,115 | A | * | 7/1998 | Bozdagi ..................... 348/452 |
| 6,259,480 | B1 | * | 7/2001 | Yamauchi et al. .......... 348/452 |
| 6,278,736 | B1 | * | 8/2001 | De Haan et al. ........ 375/240.16 |
| 6,504,577 | B1 | * | 1/2003 | Voltz et al. ................. 348/448 |
| 6,509,930 | B1 | * | 1/2003 | Hirano et al. ............... 348/452 |

* cited by examiner

*Primary Examiner*—Victor R. Kostak  
(74) *Attorney, Agent, or Firm*—Staas & Halsey LLP

(57) ABSTRACT

An apparatus for and a method of adaptive motion compensated de-interlacing of video data, in which one of a spatio-temporal method and a motion compensation method is adaptively selected according to a motion type. Motion vectors of a video field to be interpolated and an accuracy of the motion vectors are estimated using adjacent fields. An existence or non-existence of global motion is determined by analyzing the estimated motion vectors. Pixels generated according to a spatio-temporal interpolation method or pixels generated according to a motion compensated interpolation method are selected based on the accuracy of the estimated motion vectors and the existence or non-existence of global motion.

14 Claims, 7 Drawing Sheets

APPARATUS AND METHOD FOR ADAPTIVE MOTION COMPENSATED DE-INTERLACING OF VIDEO DATA

CROSS REFERENCE TO RELATED APPLICATIONS

This application claims the priority benefit of Korean Application No. 2001-32494 filed Jun. 11, 2001, in the Korean Patent Office.

BACKGROUND OF THE INVENTION

1. Field of the Invention

The present invention relates to an apparatus for and a method of converting a format of a video signal, and more particularly, to an apparatus for and a method of adaptive motion compensated de-interlacing of video data, in which either a spatio-temporal method of interpolation or a motion compensation method of interpolation is adaptively selected according to a motion type.

2. Description of the Related Art

Interlaced scanning in which two fields form a single frame is usually applied to a television video signal. To display interlaced video on a screen of a recent personal computer (PC) or high definition television which displays images usually using progressive scanning, it is necessary to generate video lines to fill blank lines using a de-interlacing method.

Figure 1:
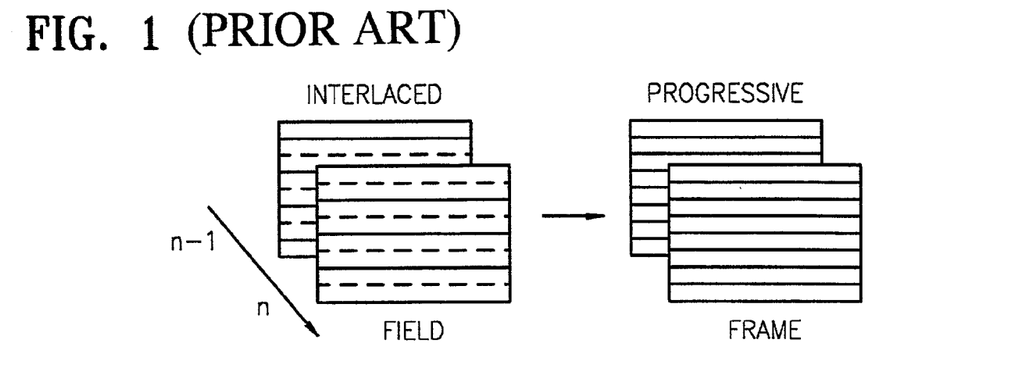
FIG. 1 is a basic conceptional diagram of typical conventional de-interlacing of video data.

FIG. 1 is a basic conceptional diagram of typical conventional de-interlacing. Referring to FIG. 1, de-interlacing is used to convert a field including odd or even samples in a vertical direction into a frame. An output frame $F_0(\vec{x}, n)$ is defined as Equation (1).

$$F_0(\vec{x}, n) = \begin{cases} F(\vec{x}, n), & (y \bmod 2 = n \bmod 2), \\ F_i(\vec{x}, n), & \text{otherwise} \end{cases} \quad (1)$$

Here, $\vec{x}$ denotes a spatial position, n denotes a field number, $F(\vec{x}, n)$ denotes an input field, and $F_1(\vec{x}, n)$ denotes an interpolated pixel. In the expressions y mod 2 and n mod 2, "mod" represents a module operation which gives a remainder after a division. For example, 5 mod 2=1, 4 mod 2=0, 3 mod 2=1 and 2 mod 2=0.

Figure 2:
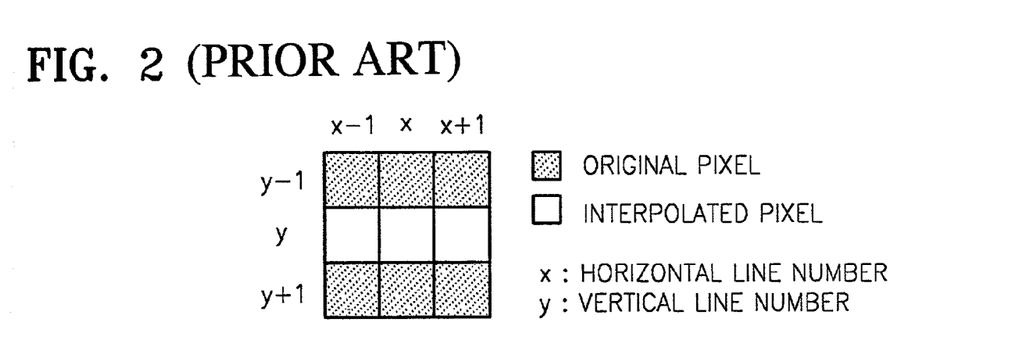
FIG. 2 shows a 3 pixel by 3 pixel window in which a typical conventional de-interlacing algorithm is applied.

FIG. 2 shows a 3 pixel×3 pixel window in which a conventional Edge-based Line Averaging (ELA) de-interlacing algorithm which does not use motion compensation is applied. Referring to FIG. 2, ELA de-interlacing uses correlation between pixels with regard to a directivity (x,y) at a position of a pixel to be interpolated, as shown in Equation (2). In other words, an average value of pixels to be interpolated is obtained using pixels adjacent to the pixels to be interpolated.

$$F_0(\vec{x}, n) = \quad (2)$$
$$\begin{cases} F(\vec{x} - \vec{u_x} - \vec{u_y}, n) + F(\vec{x} + \vec{u_x} - \vec{u_y}, n)/2, & \text{if } a < b \text{ and } a < c, \\ F(\vec{x} - \vec{u_x} + \vec{u_y}, n) + F(\vec{x} + \vec{u_x} - \vec{u_y}, n)/2, & \text{if } b > a \text{ and } b < c, \\ F(\vec{x} - \vec{u_y}, n) + F(\vec{x} + \vec{u_y}, n)/2, & (\text{otherwise}) \end{cases}$$

-continued

Figure 3:
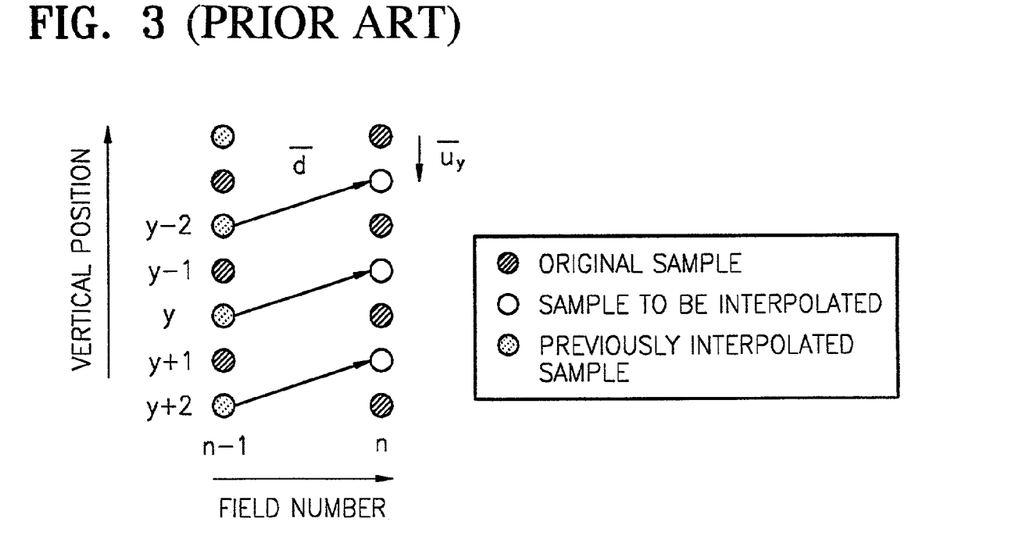
FIG. 3 is a conceptional diagram of a typical conventional time-recursive (TR) de-interlacing method.

Here, $a = |F(\vec{x} - \vec{u_x} - \vec{u_y}, n) - F(\vec{x} + \vec{u_x} + \vec{u_y}, n)|$
$b = |F(\vec{x} - \vec{u_x} + \vec{u_y}, n) - F(\vec{x} + \vec{u_x} - \vec{u_y}, n)|$
$c = |F(\vec{x} - \vec{u_y}, n) - F(\vec{x} + \vec{u_y}, n)|.$ FIG. 3 is a conceptional diagram of a typical conventional time-recursive (TR) de-interlacing method. Referring to FIG. 3, in TR de-interlacing using a motion vector, it is assumed that an (n−1)-th field is completely de-interlaced, and missing data of an n-th field is compensated for using a motion vector. A sample to be interpolated may be an original sample in the (n−1)-th field or an interpolated sample in the (n−1)-th field. Accordingly, the sample to be interpolated can be expressed by Equation (3).

$$F_0(\vec{x}, n) = \begin{cases} F(\vec{x}, n), & (y \bmod 2 = n \bmod 2) \\ F(\vec{x} - \vec{d}(\vec{x}, n), n - 1), & \text{otherwise} \end{cases} \quad (3)$$

However, since an ELA de-interlacing method does not use motion compensation, flickering and blurring occur in an area in which there is motion. Since a TR de-interlacing method performs de-interlacing consecutively, an error in one field may be propagated to another field. Further, a conventional motion compensation method has a disadvantage of generation of image artifacts.

SUMMARY OF THE INVENTION

To solve the above-described and other problems, it is a first aspect of the present invention to provide a de-interlacing method of improving picture quality by adaptively selecting either a spatio-temporal method of interpolation or a motion compensation method of interpolation according to a motion type.

It is a second aspect of the present invention to provide a de-interlacing apparatus which adaptively selects either spatio-temporal de-interlacing or a motion compensated de-interlacing according to a motion type.

Additional aspects and advantages of the invention will be set forth in part in the description which follows, and, in part, will be obvious from the description, or may be learned by practice of the invention.

To achieve the above and other aspects of the invention, there is provided a method of converting an interlaced video signal to a progressive video signal. The method comprises estimating a motion vector of a field to be interpolated and an accuracy of the motion vector using a motion vector between fields, determining existence or non-existence of global motion by analyzing the estimated motion vector, generating a pixel to be interpolated by a first method which performs motion compensation with respect to the field to be interpolated using the estimated motion vector, generating the pixel to be interpolated by a second method using pixels adjacent to the pixel to be interpolated in the field to be interpolated and pixels adjacent to the pixel to be interpolated in fields preceding and succeeding the field including the pixel to be interpolated, and selectively outputting either the pixel generated by the first method or the pixel generated by the second method according to the estimated accuracy of the motion vector and the determined existence or non-existence of global motion.

To achieve the above and other aspects the invention, there is also provided an apparatus which converts an interlaced video signal to a progressive video signal. The apparatus comprises a motion estimation unit which estimates a motion vector of a field to be interpolated using a motion vector between fields, a motion decision unit which determines existence or non-existence of global motion by analyzing the motion vector estimated by the motion estimation unit, a motion compensated interpolation unit which performs motion compensation with respect to the field to be interpolated using the motion vector estimated by the motion estimation unit to generate a pixel to be interpolated, a spatio-temporal interpolation unit which generates a pixel to be interpolated using pixels adjacent to the pixel to be interpolated in the field to be interpolated and pixels adjacent to the pixel to be interpolated in fields preceding and succeeding the field including the pixel to be interpolated, and an adaptive selection unit which selectively outputs either the pixel generated by the motion compensated interpolation unit or the pixel generated by the spatio-temporal interpolation unit according to the existence or non-existence of global motion determined by the motion decision unit.

BRIEF DESCRIPTION OF THE DRAWINGS

The above aspects and advantages of the present invention will become more apparent by describing in detail an embodiment thereof with reference to the attached drawing in which.

DESCRIPTION OF THE PREFERRED EMBODIMENTS

Reference will now be made in detail to the present embodiments of the present invention, examples of which are illustrated in the accompanying drawings, wherein like reference numerals refer to like elements throughout.

Figure 4:
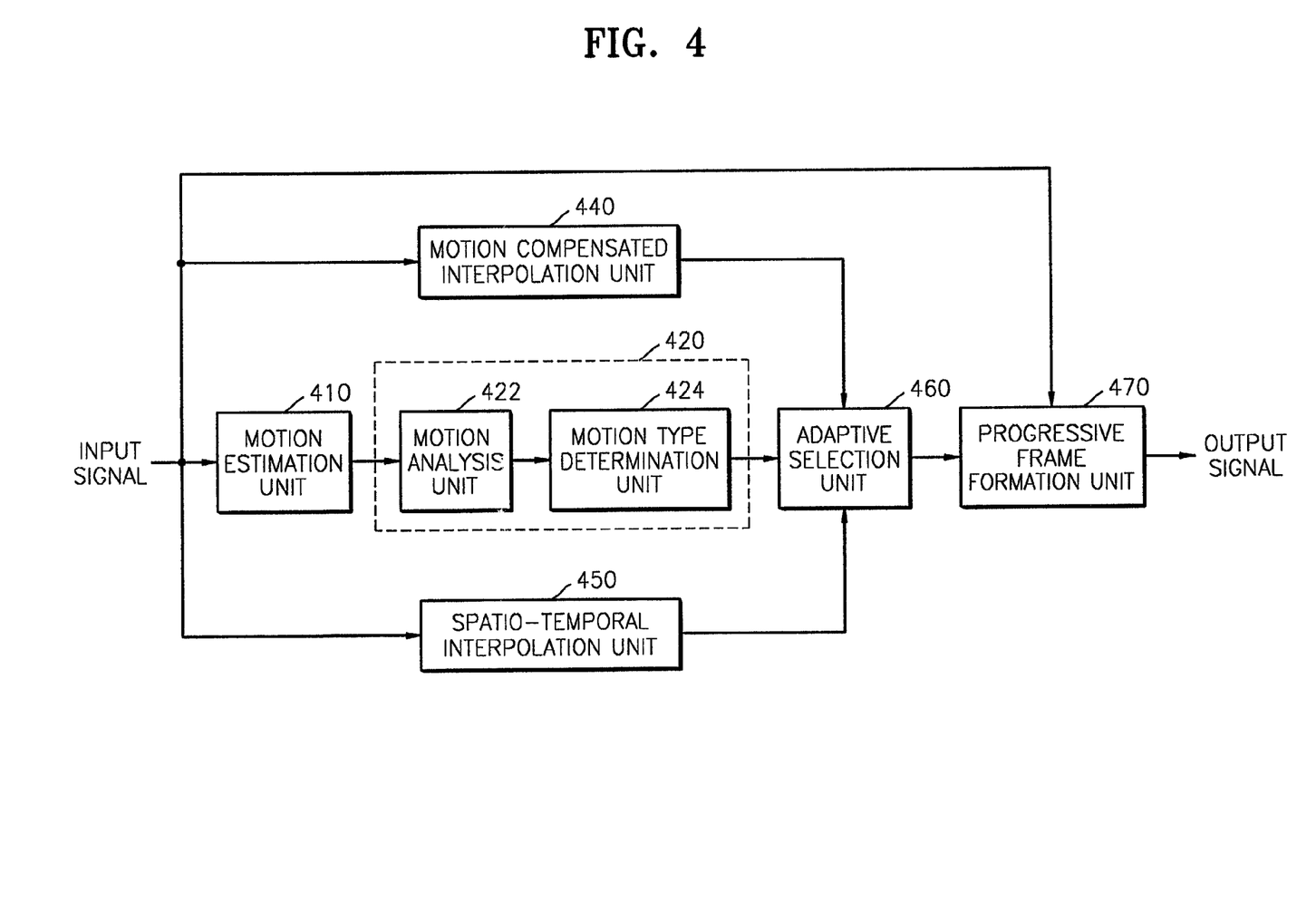
FIG. 4 is a block diagram of a de-interlacing apparatus according to an embodiment of the present invention.

FIG. 4 is a block diagram of a de-interlacing apparatus according to an embodiment of the present invention. Referring to FIG. 4, a motion estimation unit 410 estimates motion vectors of an n-th field to be interpolated from (n−1)-th and (n+1)-th fields and estimates an accuracy of each motion vector. Here, the motion estimation unit 410 estimates the motion vectors between adjacent fields having the same properties and applies half of the motion to the field to be interpolated between the adjacent fields. A cost function or a Sum of Absolute Difference (SAD) is used to indicate the accuracy of each motion vector in the field to be interpolated. The SAD of pixels of a block is accumulated and used to obtain a value for calculating the accuracy of the motion vector.

A motion information decision unit 420 includes a motion analysis unit 422 and a motion type determination unit 424. The motion information decision unit 420 analyzes the motion vectors estimated by the motion estimation unit 410 and determines a motion type. More specifically, the motion analysis unit 422 analyzes the motion vectors estimated from a current scene or field to estimate existence/non-existence of global motion and to estimate a direction of the global motion. The motion type determination unit 424 determines a motion type (global motion or local motion) of each block referring to the motion vectors estimated by the motion estimation unit 410 and the global motion of a scene analyzed by the motion analysis unit 422.

A motion compensated interpolation unit 440 generates each pixel to be interpolated from adjacent field images using a corresponding motion vector estimated by the motion estimation unit 410.

A spatio-temporal interpolation unit 450 generates each pixel to be interpolated using pixels adjacent to the pixel to be interpolated in a field to be interpolated (the n-th field) and pixels adjacent to the pixel to be interpolated in the (n−1)-th and (n+1)-th fields.

For each pixel to be interpolated, an adaptive selection unit 460 selectively outputs either the pixel generated by the motion compensated interpolation unit 440 or the pixel generated by the spatio-temporal interpolation unit 450 according to the motion type (global motion or local motion) determined by the motion type determination unit 424 and the accuracy of the motion vector estimated by the motion estimation unit 410.

A progressive frame formation unit 470 combines pixels selectively output from the adaptive selection unit 460 and the pixels of a current field to form a progressive image.

Figure 5:
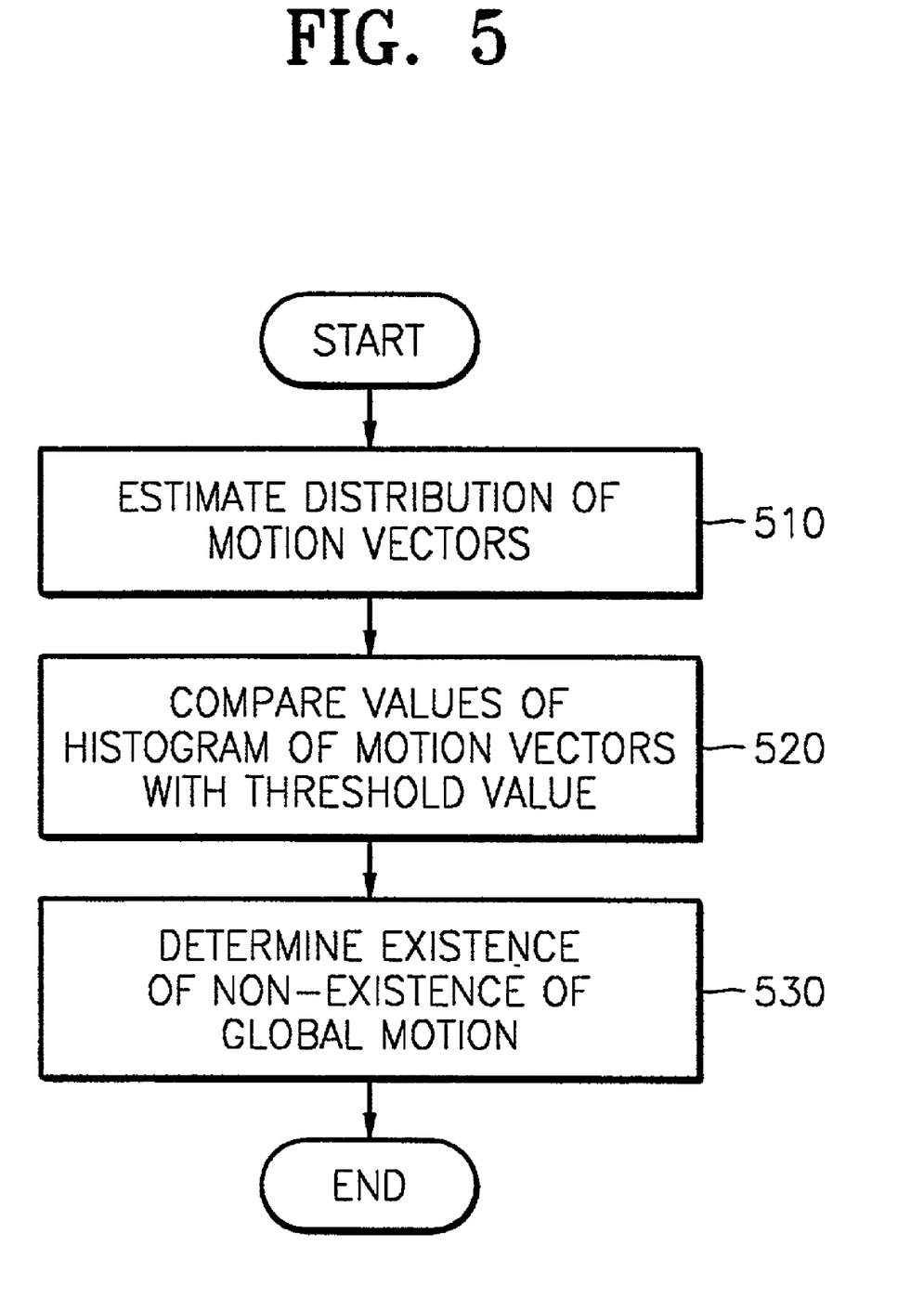
FIG. 5 is a detailed flowchart of the operation of the motion analysis unit in FIG. 4.

FIG. 5 is a detailed flowchart of the operation of the motion analysis unit 422. In operation 510, a distribution of the motion vectors, which are estimated by the motion estimation unit 410 with respect to adjacent fields, is estimated. Here, the distribution of motion vectors is represented using a histogram.

In operation 520, values of the histogram of the motion vectors are compared with a fixed or variable threshold value. In operation 530, existence or non-existence of global motion in a current scene is determined based on a result of the comparison. Where a dominant peak exists in the histogram, there are many blocks having the same motion. Where a predetermined number of blocks have the same motion, the motion is estimated as global motion.

Figure 6A:
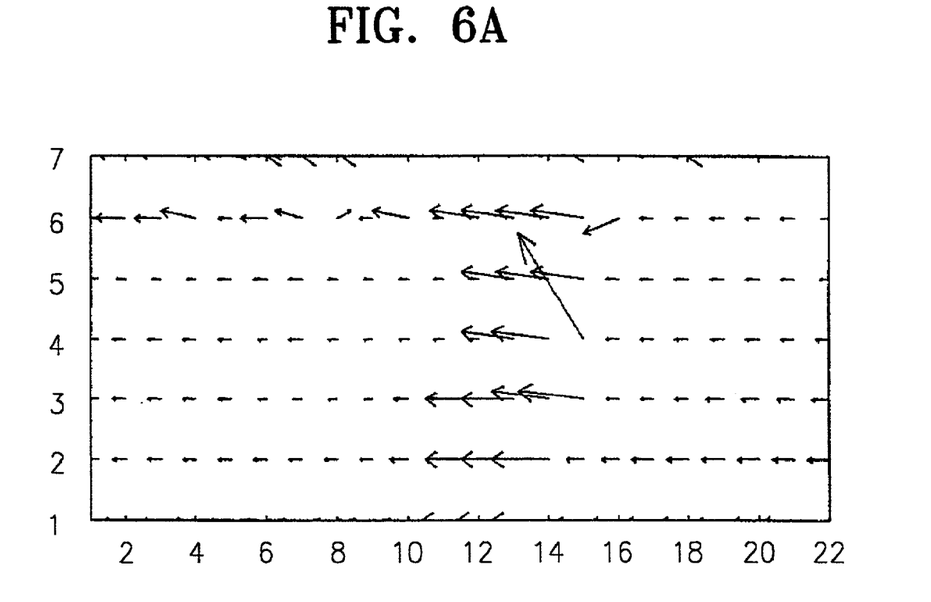
FIG. 6A is a diagram illustrating motion vectors of a current scene having global motion.
Figure 6B:
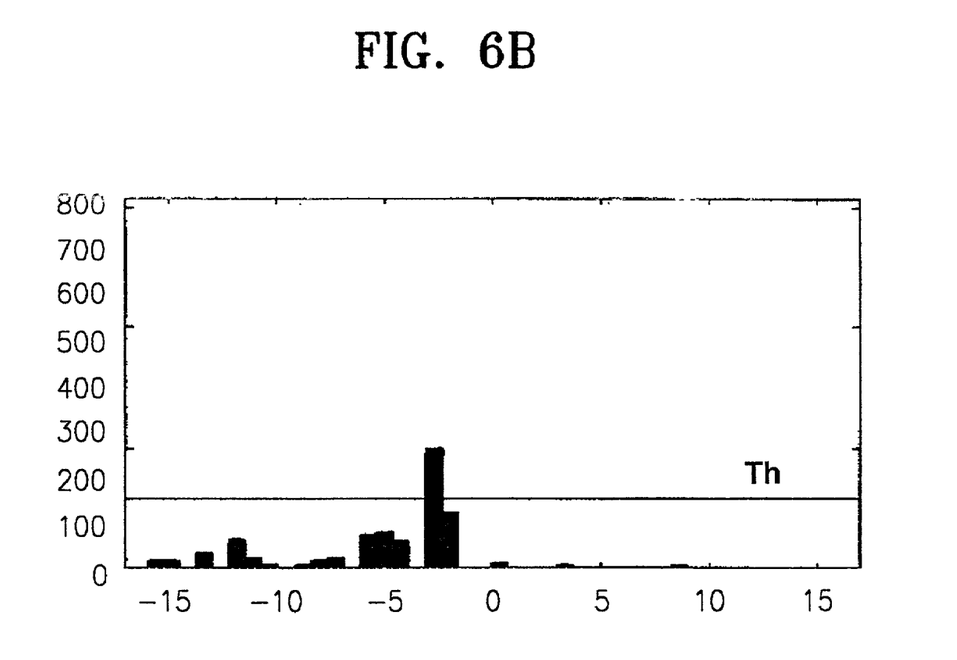
FIG. 6B is a histogram of occurrences of motion vectors of adjacent homogeneous fields corresponding to the current scene.

FIG. 6A is a diagram illustrating motion vectors of a video image where global motion exists in a current scene. In FIG. 6A, the numbers on the horizontal and vertical axes of the diagram are indices of blocks in a range. FIG. 6B is a histogram of motion vectors in two adjacent homogeneous fields of the current scene. An interlaced format image may be referred to by reference to a top field and a bottom field. A homogeneous field refers to two fields of equal parity, that is, top filed and top field or bottom field and bottom field. The histogram shown in FIG. 6B indicates that there are many blocks having the same motion vector and a determination is made that global motion exists in an image in consecutive fields. The numbers on the vertical axis represent a number of occurrences of block motion vectors having a given magnitude and direction as indicated on the horizontal axis. The determination is made based on a comparison of a peak number of occurrences with a threshold value $T_h$.

Figure 6C:
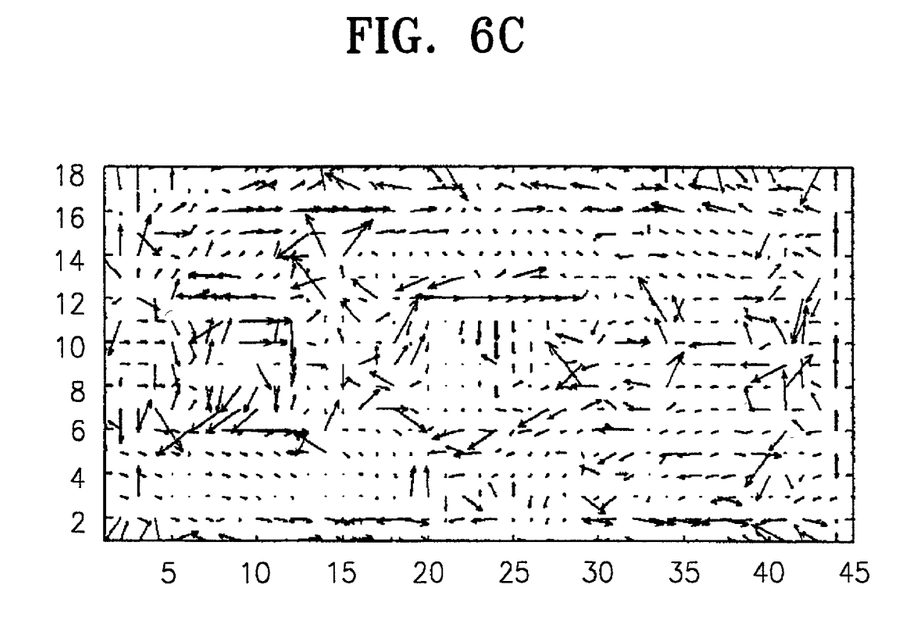
FIG. 6C is a diagram illustrating motion vectors of another video image.
Figure 6D:
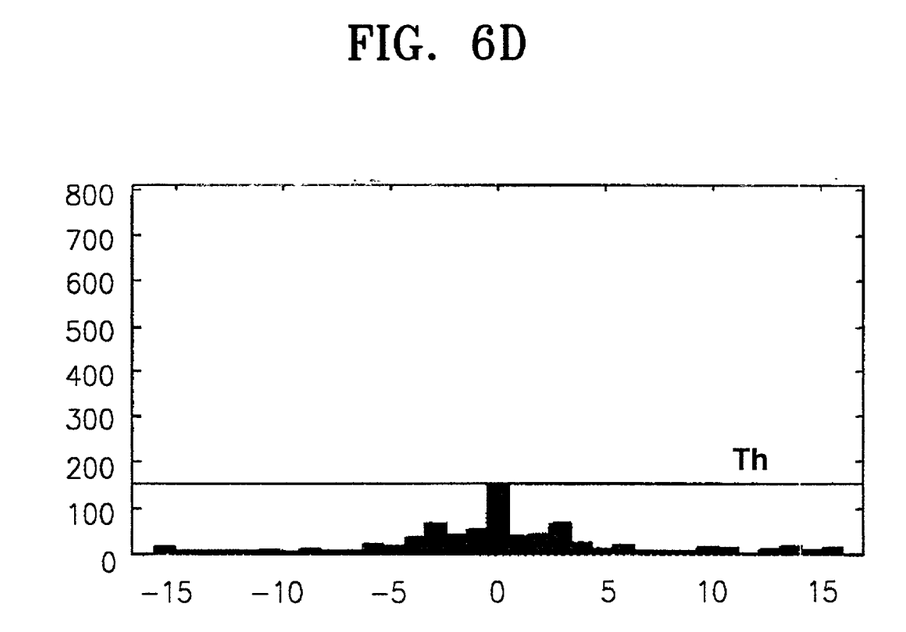
FIG. 6D is a histogram of occurrences of the motion vectors of FIG. 6C.

FIG. 6C is a diagram illustrating motion vectors of a video image where global motion does not exist in a current scene but the current scene has a local motion. As in FIG. 6A, the numbers on the horizontal and vertical axes of the diagram in FIG. 6C are indices of blocks in a range and the numbers on the vertical axis of FIG. 6D represent a number of occurrences of block motion vectors having a given magnitude and direction as indicated on the horizontal axis. A histogram shown in FIG. 6D represents that there is no motion vector having a number of occurrences greater than the threshold value $T_h$. In other words, no global motion exists in a current field image, and all motion vectors are classified as local motion vectors.

FIGS. 6D and 6D show histograms of motion vectors in one direction only. Similar histograms are generated in the other direction. The search range for motion vectors is set to a predetermined value, such as for example, −16 pixels to +16 pixels. Hence a component of a motion vector, either $V_x$ or $V_y$ of $H=[V_x, V_y]'$, can have values in [−16, 16]. The horizontal axes of FIGS. 6B and 6D represent these values. The vertical axes of FIGS. 6B and 6D represent a number of times a component of the motion vector has the corresponding value. In short, the horizontal axis of each of FIGS. 6B and 6D represents the component of a motion vector and the vertical axis represents the number of occurrences.

Figure 7:
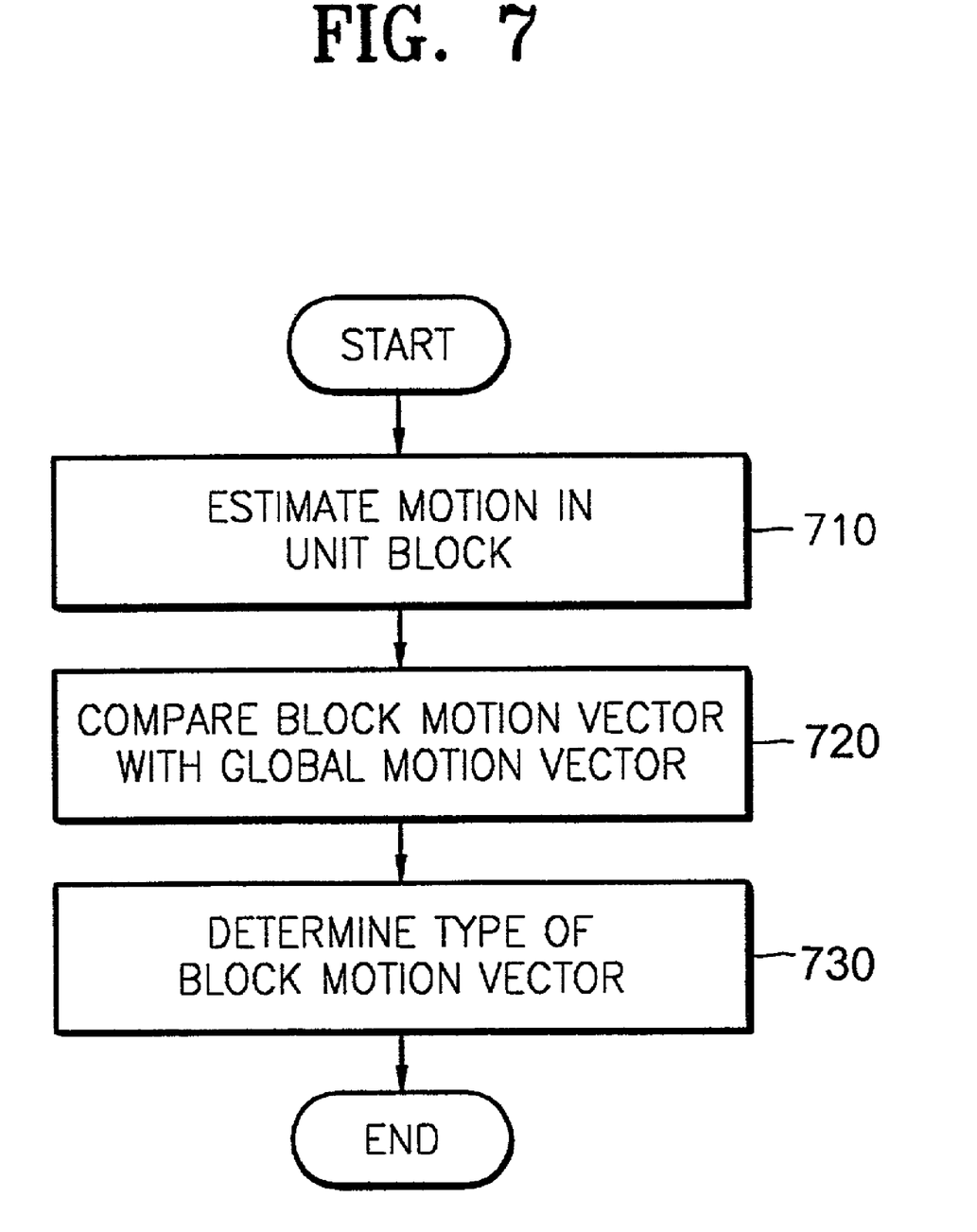
FIG. 7 is a detailed flowchart of the operation of the motion type determination unit shown in FIG. 4.

FIG. 7 is a detailed flowchart of operation of the motion type determination unit 424. In operation 710, the motion vector of a unit block in a field to be interpolated is estimated.

Next, a property of the motion vector in a block is estimated. Here, where a magnitude of the motion vector of the block in the field to be interpolated is small or zero, the motion type of the block in the field to be interpolated is set to zero motion. In contrast, where the magnitude of the motion vector in the block in the field to be interpolated is at least a predetermined value, the motion vector of the block is compared with a global motion vector obtained from a current scene in operation 720. The global motion vector is the motion vector that occurs most often, as determined from the histograms discussed above with reference to FIGS. 6B and 6D. The motion vector with the most occurrences is used as the global motion vector. The motion type of the block in the field to be interpolated is determined in operation 730. Where the difference between the motion vector of the block in the field to be interpolated and the global motion vector is less than a predetermined threshold value, the motion type of the block is set to global motion. In contrast, where the difference between the block motion vector and the global motion vector exceeds the predetermined threshold value, the motion type of the block is set to local motion.

Figure 8:
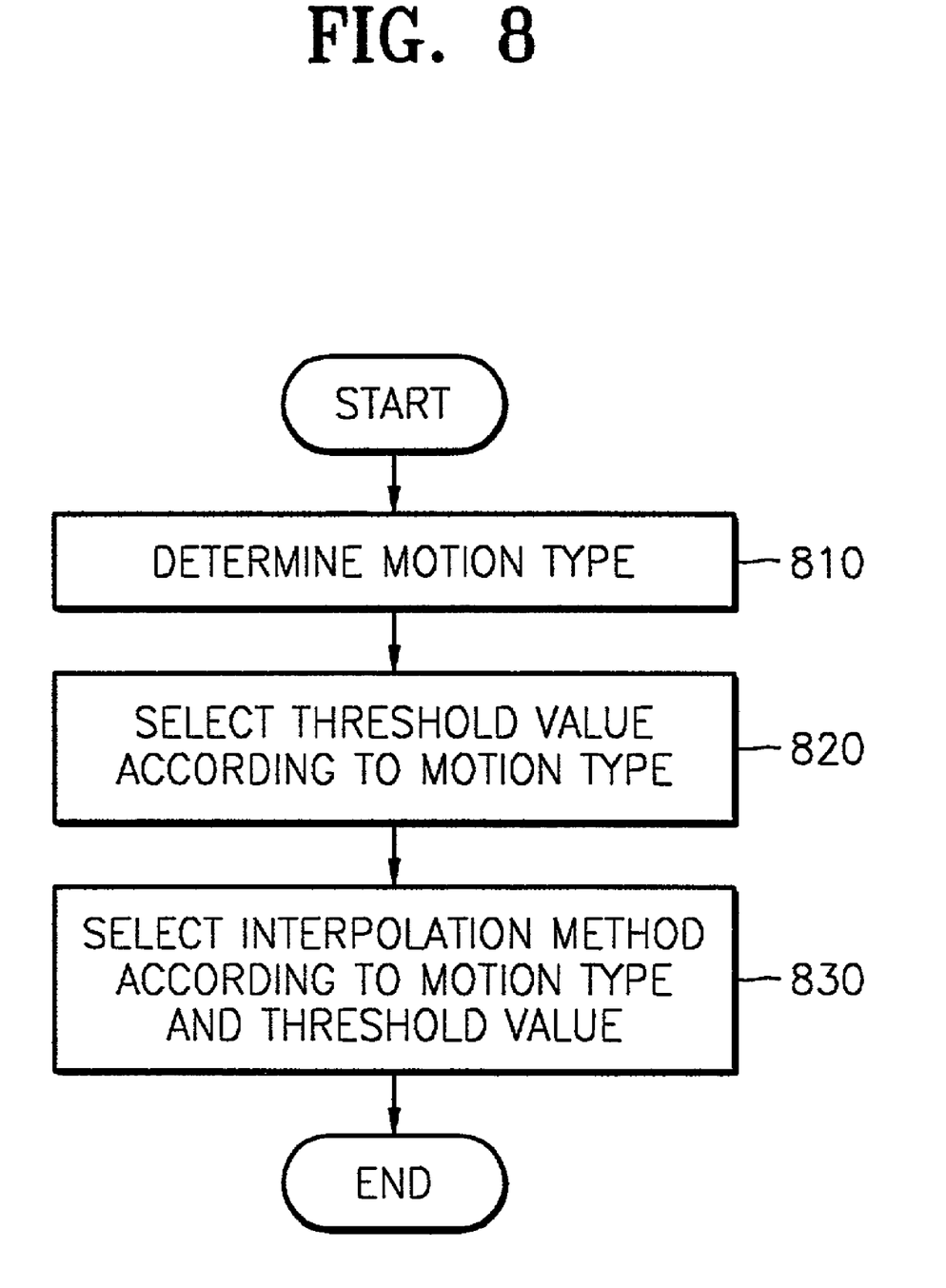
FIG. 8 is a detailed flowchart of operation of the adaptive selection unit of FIG. 4.

FIG. 8 is a detailed flowchart of the operation of the adaptive selection unit 460. In operation 810, a motion type is determined according to input motion type information. In operation 820, a threshold value is selected according to the motion type as determined by the motion type determination unit 424. In operation 830, one of motion compensated interpolation and spatio-temporal interpolation is selected according to the motion type and the selected threshold value.

In more detail, where the motion type of a block in a field to be interpolated is global motion, and where the accuracy of the motion of the block exceeds a predetermined threshold, pixels generated according to motion compensated interpolation are selected as the interpolated pixels. Where the motion type of a block in a field to be interpolated is global motion, and where the accuracy of the motion of the block is less than the predetermined threshold, pixels generated according to spatio-temporal interpolation are selected as the interpolated pixels.

Where the motion type of a block in a field to be interpolated is local motion, and where the accuracy of the motion of the block exceeds the predetermined threshold, pixels generated according to motion compensated interpolation are selected as the interpolated pixels. Where the motion type of a block in a field to be interpolated is local motion, and where the accuracy of the motion of the block is less than the predetermined threshold, pixels generated according to spatio-temporal interpolation are selected as the interpolated pixels.

Where the motion type of a block in a field to be interpolated is zero motion, and where the accuracy of the motion of the block exceeds the predetermined threshold, pixels generated according to motion compensated interpolation are selected as the interpolated pixels. Where the motion type of a block in a field to be interpolated is zero motion, and where the accuracy of the motion of the block is less than the predetermined threshold, pixels generated according to spatio-temporal interpolation are selected as the interpolated pixels. Here, the accuracy of motion and the predetermined threshold which is compared with the accuracy vary according to motion type.

In summary, according to the present invention, either a motion compensated interpolation value or a spatio-temporal interpolation value is adaptively selected according to the degree of motion in an input image, thereby efficiently reducing flickering and artifacts.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of converting an interlaced video signal to a progressive video signal, the method comprising:
    estimating motion vectors of a field to be interpolated and an accuracy of the motion vectors using motion vectors of adjacent fields of the video signal;
    determining existence or non-existence of global motion by analyzing the estimated motion vectors;
    generating a pixel to be interpolated by a first method which performs motion compensation with respect to the field to be interpolated using at least one of the estimated motion vectors;
    generating the pixel to be interpolated by a second method which uses pixels adjacent to the pixel to be interpolated in the field to be interpolated and pixels adjacent to the pixel to be interpolated in the fields preceding and succeeding the field of the pixel to be interpolated; and
    selectively outputting one of the pixel generated by the first method or the pixel generated by the second method according to the estimated accuracy of the at least one estimated motion vector and the determined existence or non-existence of global motion, wherein the estimating of the accuracy of the at least one motion vector comprises accumulating differences among all pixels in a block.

2. The method of claim 1, wherein the estimating of the motion vectors is performed with respect to adjacent homogeneous fields.

3. The method of claim 1, wherein the determining of the existence or non-existence of global motion comprises:

estimating global motion in a current scene based on a distribution of motion vectors of a plurality of blocks; and determining the motion type of a block including a pixel of the field to be interpolated by comparing the motion vector of the block including a pixel of the field to be interpolated with a vector of the estimated global motion.

4. The method of claim 3, wherein the distribution of the motion vectors is represented with a histogram.

5. The method of claim 3, wherein a vector of global motion is estimated from a value of a peak in the histogram of the motion vectors.

6. The method of claim 3, wherein a vector of global motion is estimated by comparing a value of the histogram of the motion vectors with a threshold value.

7. The method of claim 3, wherein the vector of global motion is estimated by comparing a value of the histogram of the motion vectors with a variable threshold value which changes based on a value of the global motion vector.

8. The method of claim 3, wherein the determining of the motion type of the block comprises:

setting the motion type of the block to global motion where a difference between the motion vector of the block and the vector of the global motion is less than a predetermined threshold value;

setting the motion type of the block to local motion where a difference between the motion vector of the block and the vector of the global motion exceeds the predetermined threshold value; and setting the motion type of the block to zero motion where a magnitude of the motion vector of the block is less than a predetermined reference value.

9. The method of claim 1, wherein the selectively outputting comprises:

selecting the pixel generated by the first method as the pixel to be interpolated where the motion type of a block including the pixel of the field to be interpolated is global motion and the estimated accuracy of the at least one motion vector is greater than a predetermined threshold value, and selecting the pixel generated by the second method as the pixel to be interpolated where the motion type of a block including the pixel of the field to be interpolated is global motion and the estimated accuracy of the at least one motion vector is less than the predetermined threshold value.

10. The method of claim 1, wherein the selectively outputting comprises:

selecting the pixel generated by the first method as the pixel to be interpolated where the motion type of a block including the pixel of the field to be interpolated is local motion and the estimated accuracy of the at least one motion vector is greater than a predetermined threshold value, and selecting the pixel generated by the second as the pixel to be interpolated where the motion type of a block including the pixel of the field to be interpolated is local motion and the estimated accuracy of the at least one motion vector is less than the predetermined threshold value.

11. The method of claim 1, wherein the selectively outputting comprises:

selecting the pixel generated by the first method as the pixel to be interpolated where the motion type of a block including the pixel of the field to be interpolated is zero motion and the estimated accuracy of the at least one motion vector is greater than a predetermined threshold value, and selecting the pixel generated in by the second method as a pixel to be interpolated when the motion type of the block including a pixel of the field to be interpolated is zero motion and the estimated accuracy of the at least one motion vector estimated is less than the predetermined threshold value.

12. The method of claim 9, wherein the threshold value varies according to the motion type.

13. The method of claim 10, wherein the threshold value varies according to the motion type.

14. The method of claim 11, wherein the threshold value varies according to the motion type.

* * * * *